United States Patent [19]
Gottschalk

[11] 4,298,255
[45] Nov. 3, 1981

[54] APPARATUS FOR PREFLASHING MOTION PICTURE FILM

[75] Inventor: Robert E. Gottschalk, Los Angeles, Calif.

[73] Assignee: Panavision, Incorporated, Tarzana, Calif.

[21] Appl. No.: 168,518

[22] Filed: Jul. 14, 1980

[51] Int. Cl.³ .............................................. G03B 21/32
[52] U.S. Cl. ...................................... 352/85; 352/46; 352/72; 354/202
[58] Field of Search ....................... 352/44, 45, 46, 85, 352/72; 354/202, 126

[56] References Cited

U.S. PATENT DOCUMENTS

| 4,021,831 | 5/1977 | Bercher | 354/126 |
| 4,172,640 | 10/1979 | Land | 352/72 |

*Primary Examiner*—Monroe H. Hayes
*Attorney, Agent, or Firm*—Lyon & Lyon

[57] ABSTRACT

An insert body is interposed between a film magazine and a motion picture camera, and is provided with a cavity containing a light source. An elongated opening in the body transmits light to preflash motion picture film passing from the film magazine into the motion picture camera. Controls on the quantity and quality of light are provided. In one form of control, a translucent cylindrical rod extends into the light source cavity and has an end face exposed to the light source. The translucent rod has an opaque lateral surface interrupted on one side by an axially extending light transmitting window. In another form of control, a window in the side of the translucent rod receives light from the light source. In a third form of control a cylindrical shell with opposed parallel windows takes the place of the translucent rod. In all cases, the translucent rod or shell has a head portion accessible exteriorly of the body for turning it to change the amount of light passing through the elongated opening.

14 Claims, 12 Drawing Figures

APPARATUS FOR PREFLASHING MOTION PICTURE FILM

This invention relates to photography and is particularly directed to improvements in apparatus for preflashing motion picture film by exposing its emulsion side uniformly with light of very low intensity. It is a feature of this invention that the preflashing occurs as the negative film strip is fed from the film magazine into the motion picture camera.

It is known that preflashing of photographic film may improve its light sensitivity so that the camera may be operated at one and one-half to two "T"-stops less than that required without preflashing. It is highly desirable to control the low level of light for preflashing without using a rheostat for the light source, because adjusting the rheostat changes the color temperature of the light, which is undesirable. Moreover, the light for preflashing should be uniformly distributed over the emulsion side of the negative film. Also, there should be provision for color filters to control the desired quality of light.

In accordance with this invention, these and other desirable characteristics are obtained by providing apparatus for preflashing motion picture film as it moves between a conventional film magazine and a conventional motion picture camera. The apparatus may be formed as a part of the motion picture camera or a part of the film magazine or may comprise a separate insert installed between the camera and the magazine. In any case the apparatus includes a body having an internal cavity in which an electric lamp is positioned to serve as a source of light. A translucent cylindrical rod or a hollow shell has a portion exposed to the light source.

In a preferred embodiment of the invention, an end face of the translucent rod is exposed to the light source. An axially extending window on the cylindrical outer surface of the translucent rod interrupts an opaque coating which covers the remainder of the outer surface of the rod. A narrow elongated opening is positioned in a wall of the body, parallel to the window, and a removable filter cartridge is located between the translucent rod and the narrow elongated opening. Light from the source then passes out through its lateral window and through the narrow elongated opening in the wall of the cavity to preflash the motion picture film as it passes through a slot in the body.

In another embodiment of the invention, the portion of the translucent rod which is exposed to the light source comprises an axially extending light-receiving opening in the opaque coating on the translucent rod. In still another embodiment, a hollow cylindrical shell has diametrically opposed window slots through which the light passes.

In all embodiments, the amount of light for preflashing may be controlled by turning an exposed head on the translucent rod or hollow shell so that more or less light from the window(s) reaches the narrow elongated opening in the insert body. A filter cartridge may be removably positioned between the translucent rod and the narrow elongated opening.

Other and more detailed objects and advantages will appear hereinafter.

Figure 1:
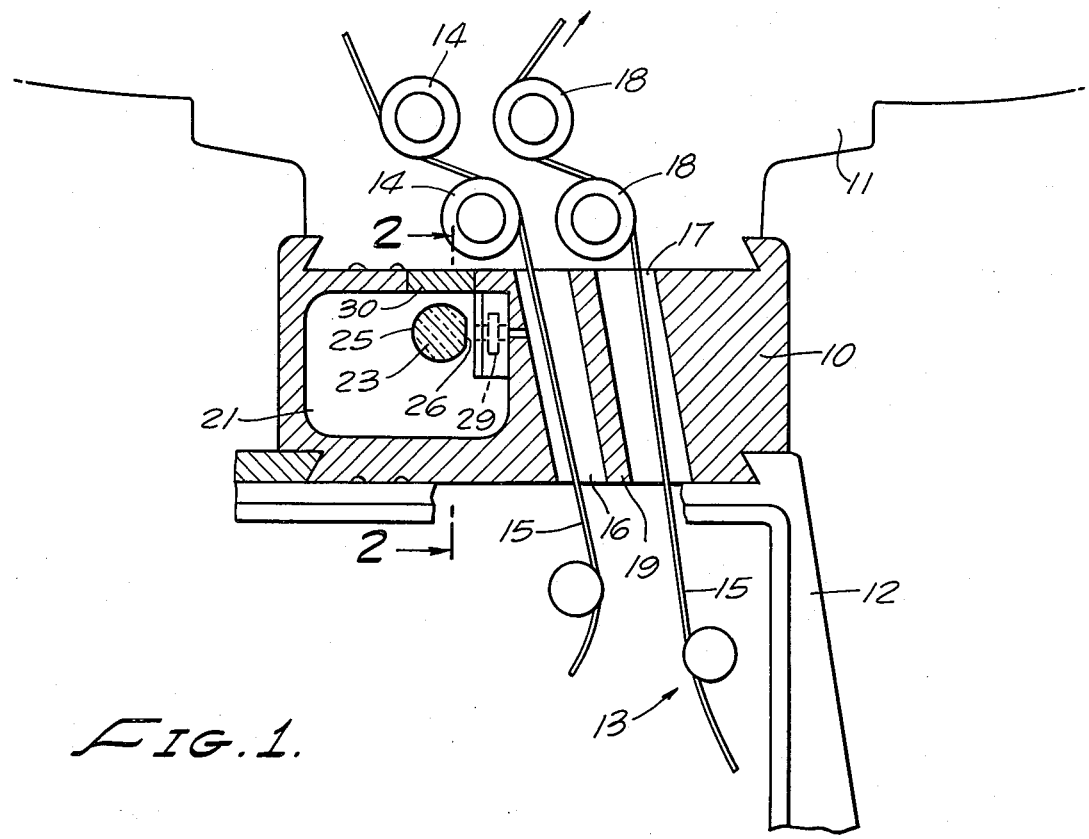
FIG. 1 is a sectional elevation showing a preferred embodiment of this invention.
Figure 2:
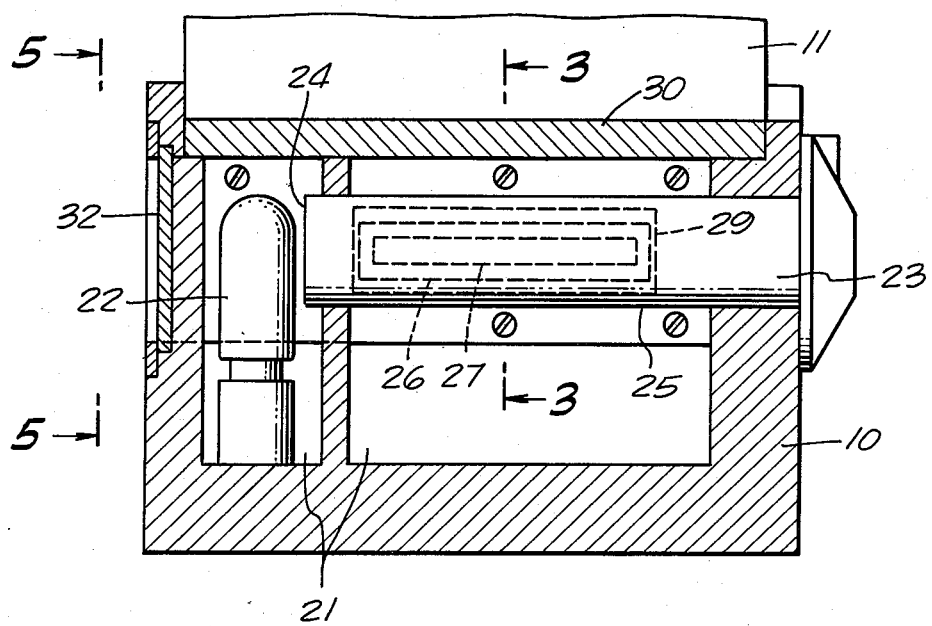
FIG. 2 is a transverse sectional view taken substantially on the lines 2—2 as shown in FIG. 1.
Figure 3:
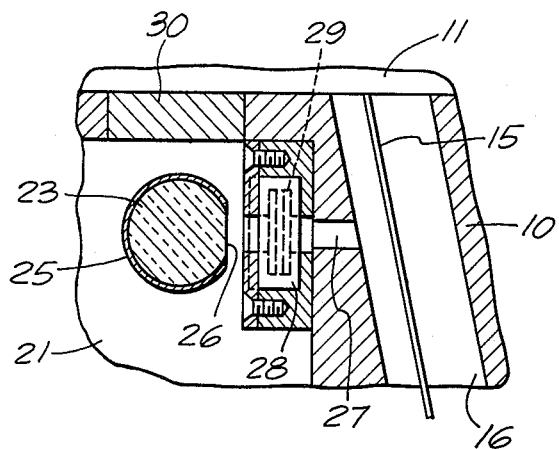
FIG. 3 is a sectional detail similar to a portion of FIG. 1, shown on an enlarged scale.
Figure 4:
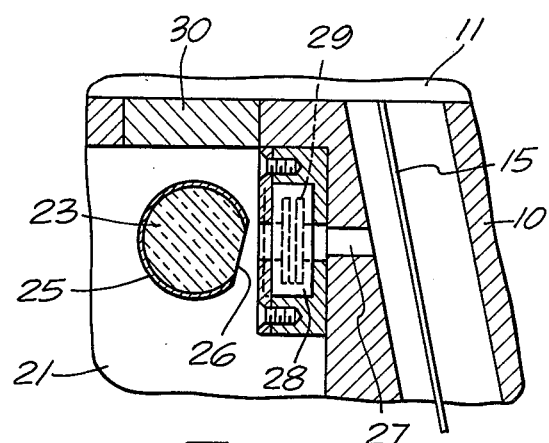
FIG. 4 is a view similar to FIG. 3 showing the translucent rod turned to a different position.

Referring to FIGS. 1-6 of the drawings, the insert body 10 formed of opaque material is operatively interposed between the film magazine 11 and the housing 12 of the motion picture camera generally designated 13. Supply rollers 14 in the film magazine 11 deliver a motion picture negative film strip 15 into the camera 13 through a first slot 16. After passing through the camera "movement" (not shown) the film strip 15 passes from the camera housing 12 through the second slot 17 and over the takeup rollers 18 in the film magazine 11. The separator wall 19 in the body 10 isolates the slots 16 and 17.

In accordance with this invention, the walls of the body 10 define a cavity 21 which contains a light source 22. The translucent cylindrical rod 23 has an end face 24 which receives light from the source 22 and transmits it axially along the translucent rod 23. The cavity walls support the rod 23 for turning movement. The inside surface of the portion of the cavity 21 enclosing the light source 22 is preferably painted white to reflect the maximum amount of light toward the end face 24 of the translucent rod 23. The outer surface of the cylindrical portion of the rod 23 is coated with an opaque substance 25 interrupted only by an elongated window 26 extending parallel to the axis of the cylindrical rod 23. A removable cover 30 permits replacement of the light source 22 as well as inspection of the translucent rod 23, its opaque surface 25, and its window 26.

A narrow elongated opening 27 parallel to the window 26 is provided in a wall of the cavity and extends between the cavity 21 and the first slot 16. A removable filter cartridge 28 is interposed between the elongated opening 27 and the window 26 of the translucent rod 23. In the general plan of operation, light from the source 22 passes into the translucent rod 23 through its end face 24 and is projected laterally through the window 26, through the filters 29 in the cartridge 28 and then through the narrow elongated opening 27 to preflash the emulsion side of the film strip 15. The amount of light for preflashing is controlled by turning the cylindrical translucent rod 23 by means of its head 31 which is accessible exteriorly of the body 10. Turning of the rod 23 moves it from the maximum light position as shown in FIG. 1 to a position such as that shown in FIG. 4 in which the window 26 is canted or tilted with respect to the narrow elongated opening 27. This construction insures an even distribution of light through the length of the narrow elongated opening 27.

Figure 5:
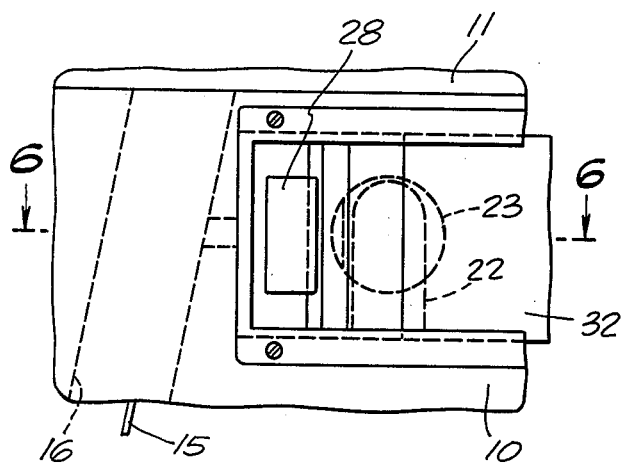
FIG. 5 is a fragmentary side view.
Figure 6:
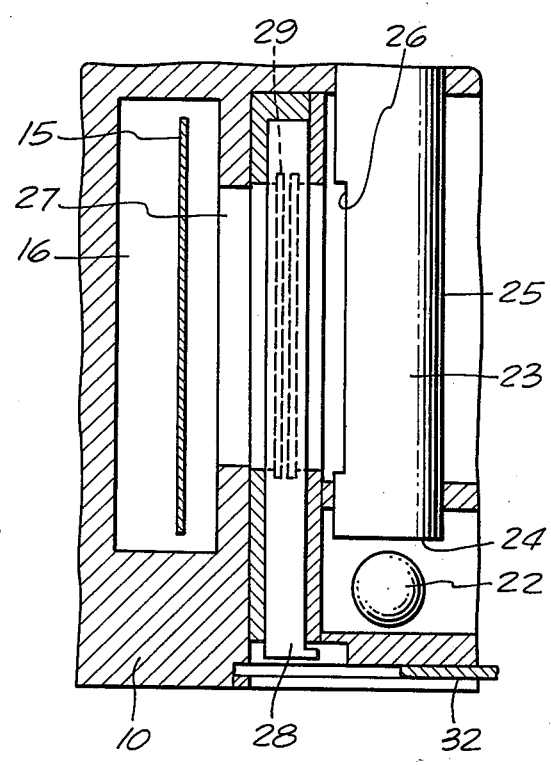
FIG. 6 is a sectional plan view taken substantially on the lines 6—6 as shown in FIG. 5.

The filter cartridge 28 may be withdrawn laterally from the cavity 21 by sliding the cover 32 to one side, as shown in FIG. 5. This permits the individual filters 29 to be installed or removed as desired. The filters control the color of light which passes through the elongated opening 27 to preflash the film strip 15. For example, three filters could be individually colored cyan, magenta, and yellow.

Figure 7:
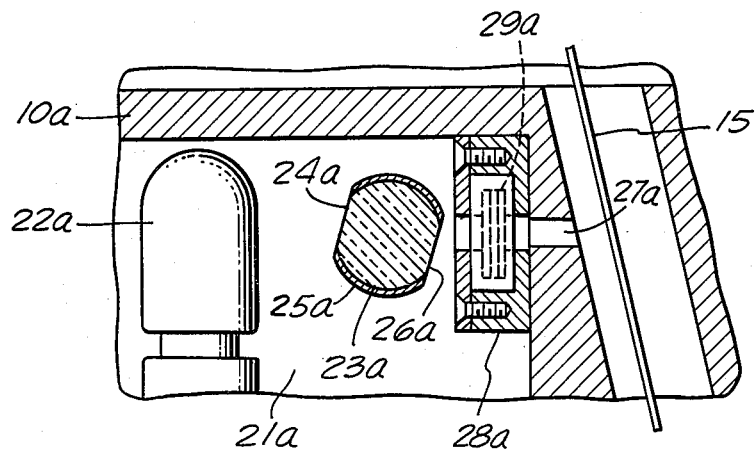
FIG. 7 is a sectional view similar to FIG. 4, showing a modification.

In the modified form of the invention shown in FIG. 7, the light source 22a is mounted in the same cavity 21a with the translucent rod 23a. The light source may comprise one or more small lamps. The window 26a is similar to that previously described, but in addition there is another window or axially extending light-receiving opening 24a in the opaque coating 25a and located directly opposite the window 26a. Light from the source 22a passes through the two windows 24a and 26a, through the filter carrier 28a and narrow opening 27a to preflash the film 15. Turning of the translucent rod 23a serves to vary the amount of light passing through the filters 29a and through the narrow opening 27a. The head of the translucent rod 23a projects exteriorly of the body 10a as described above.

Figure 8:
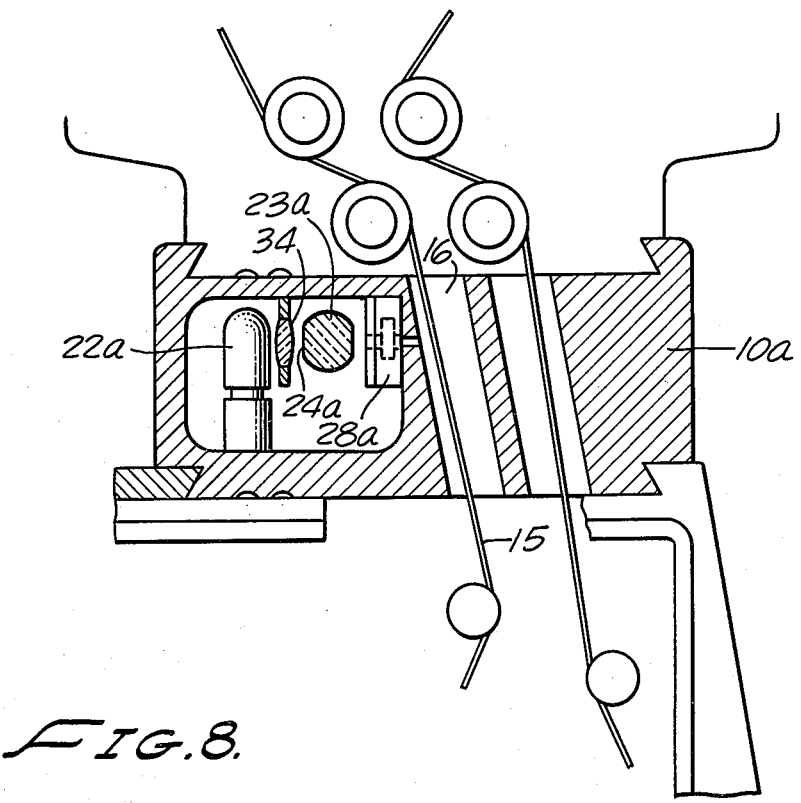
FIG. 8 is a sectional view similar to FIG. 1, showing another modification.

In the modified form of the invention shown in FIG. 8, a condenser lens 34 is positioned between the light source 22a and the translucent rod 23a in order to spread the light evenly into the second window 24a.

Figure 9:
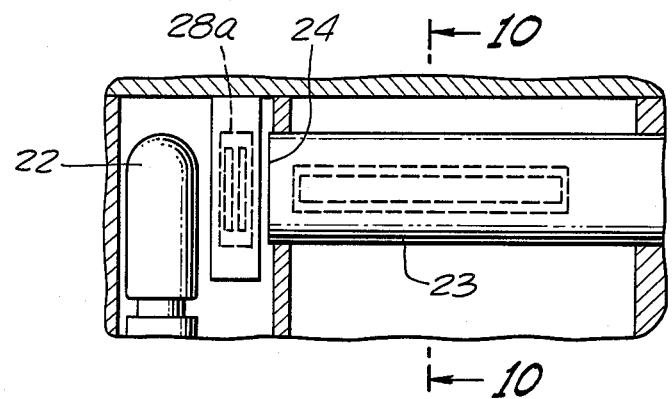
FIG. 9 is a fragmentary sectional view similar to FIG. 2 but showing a filter cartridge between the light source and the end face of the translucent rod.
Figure 10:
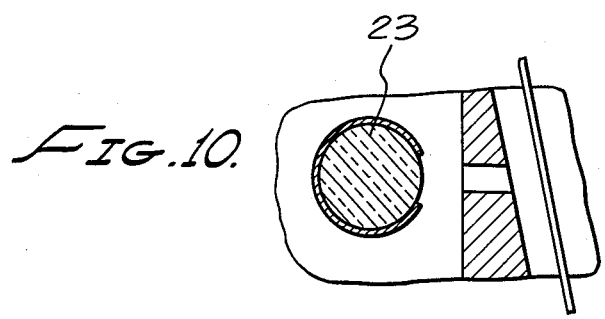
FIG. 10 is a transverse sectional detail taken substantially on the lines 10—10 as shown in FIG. 9.

In the modified form of the invention shown in FIGS. 9 and 10, the filter cartridge 28a is placed between the light source 22 and the end face 24 of the translucent rod 23.

Figure 11:
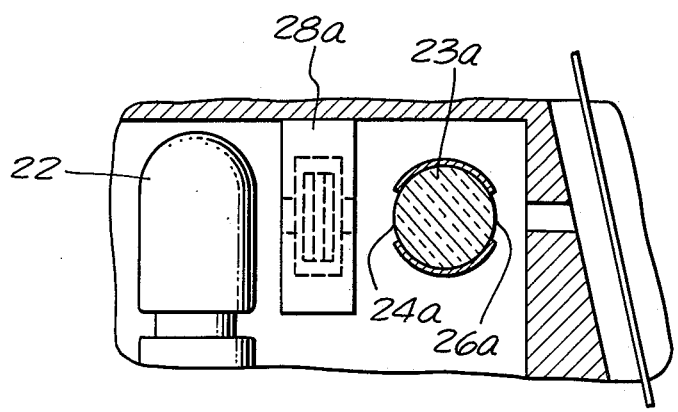
FIG. 11 is a sectional detail similar to FIG. 7 but showing the filter cartridge interposed between the light source and the translucent rod.

In the form of the invention shown in FIG. 11, the filter cartridge 28a is placed between the light source 22 and the window 24a of the translucent rod 23a.

Figure 12:
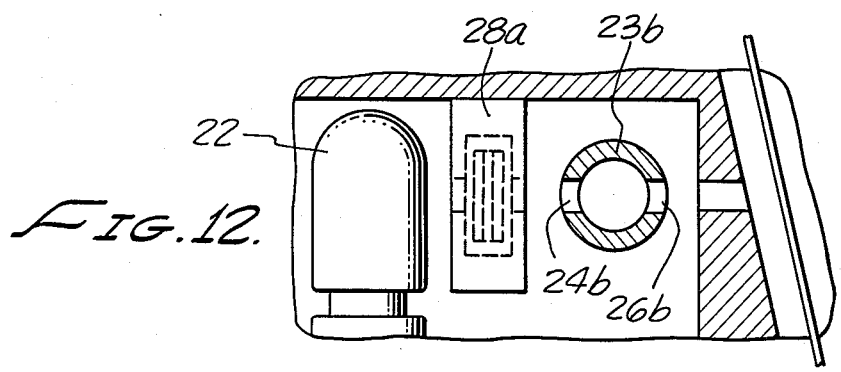
FIG. 12 is a sectional detail similar to FIG. 11 but showing a hollow cylindrical shell for light control, instead of a translucent rod.

In the form of the invention shown in FIG. 12, the filter cartridge 28a is placed between the light source 22 and the hollow cylindrical shell 23b. The hollow shell 23b has diametrically opposed window openings 24b and 26b.

It will be understood that although the preflash apparatus is shown as being embodied in a separate unit 10 clamped between the film magazine 11 and the housing 12 of the motion picture camera 13, the preflash unit may be embodied within the film magazine 11 or within the housing 12 of the camera 13.

It will be understood that the light source in each embodiment is operated at full power. It is not necessary to change the light intensity by means of a rheostat or the like, because such control changes the color temperature of the light, which is undesirable.

Having fully described my invention, it is to be understood that I am not to be limited to the details herein set forth but that my invention is of the full scope of the appended claims.

I claim:

1. Apparatus for preflashing unexposed motion picture film as it travels from a film magazine into the housing of a motion picture camera, comprising in combination: wall means forming a cavity, a light source within said cavity, a translucent rod extending into said cavity and having a portion exposed to said light source, said rod having an opaque lateral surface interrupted along one side by an axially extending light transmitting window, said wall means having an elongated opening through which light from said window can preflash the motion picture film, and means located exteriorly of said cavity for moving the translucent rod to change the amount of light passing through said opening.

2. The combination set forth in claim 1 in which said wall means are formed in a body operatively interposed between the film magazine and the motion picture camera.

3. The combination set forth in claim 1 in which filters are removably mounted between said window and said elongated opening.

4. Apparatus for preflashing unexposed motion picture film as it travels from a film magazine into the housing of a motion picture camera, comprising in combination: wall means forming a cavity, a light source within said cavity, a translucent cylindrical rod extending into said cavity and mounted to turn about its longitudinal axis, said translucent rod having an end face exposed to said light source, said rod having an opaque lateral surface interrupted on one side by a flat axially extending light transmitting window, said wall means having an elongated opening through which light from said window can preflash the motion picture film, said translucent rod having a head portion accessible exteriorly of the camera housing for turning the translucent rod to change the amount of light passing through said elongated opening.

5. The combination set forth in claim 4 in which the body is provided with a first slot for film entering the camera housing and a second slot for film leaving the camera housing, and a separator wall between said slots to prevent light transmitted through said elongated opening into said first slot from reaching said second slot.

6. Apparatus for preflashing unexposed motion picture film as it travels from a film magazine into the housing of a motion picture camera, comprising in combination: a body adapted to be operatively interposed between the film magazine and the motion picture camera, wall means forming a cavity within said body, a light source within said cavity, a translucent cylindrical rod extending into said cavity and mounted to turn in the body about its longitudinal axis, said translucent rod having an end face exposed to said light source, said rod having an opaque lateral surface interrupted on one side by an axially extending light transmitting window, said body having an elongated opening through which light from said window can preflash the motion picture film, said translucent rod having a head portion accessible exteriorly of the body for turning the translucent rod to change the amount of light passing through said opening.

7. Apparatus for preflashing unexposed motion picture film as it travels from a film magazine into the housing of a motion picture camera, comprising in combination: wall means forming a cavity, a light source within said cavity, a translucent rod extending into said cavity, said rod having an opaque lateral surface interrupted along one side by an axially extending light transmitting window, said rod having a side portion exposed to said light source, said wall means having an elongated opening through which light from said window can preflash the motion picture film, and means located exteriorly of said cavity for moving the translucent rod to change the amount of light passing through said opening.

8. The combination set forth in claim 7 in which a condenser lens is interposed between the light source and said side portion of the translucent rod.

9. Apparatus for preflashing unexposed motion picture film as it travels from a film magazine into the housing of a motion picture camera, comprising in combination: wall means forming a cavity, light source means within said cavity, a translucent rod extending into said cavity, said rod having an opaque lateral surface interrupted along opposite sides to form axially extending light-transmitting windows, a first of said windows being exposed to said light source means, said wall means having an elongated opening through which light from the second window can preflash the motion picture film, and means located exteriorly of said cavity for turning the translucent rod to change the amount of light passing through said elongated opening.

10. The combination set forth in claim 9 in which a condenser lens is interposed between said light source and said first window.

11. Apparatus for preflashing unexposed motion picture film as it travels from a film magazine into the housing of a motion picture camera, comprising in combination: wall means forming a cavity, a light source within said cavity, a rod member extending into said cavity and having a portion exposed to said light source, said rod having an opaque lateral surface interrupted along at least one side of an axially extending light transmitting window, said wall means having an elongated opening through which light from said window can preflash the motion picture film, and means located exteriorly of said cavity for moving the rod member to change the amount of light passing through said opening.

12. The combination set forth in claim 11 in which said rod member is translucent.

13. The combination set forth in claim 11 in which said rod member comprises a hollow cylinder with diametrically opposed axially extending windows.

14. The combination set forth in claim 11 in which removable filters are operatively positioned in the light path.

* * * * *